United States Patent
Itoga

(10) Patent No.: US 7,748,735 B2
(45) Date of Patent: Jul. 6, 2010

(54) AIRBELT SYSTEM

(75) Inventor: Yasuo Itoga, Tokyo (JP)

(73) Assignee: Takata Corporation, Tokyo (JP)

( * ) Notice: Subject to any disclaimer, the term of this patent is extended or adjusted under 35 U.S.C. 154(b) by 117 days.

(21) Appl. No.: 11/992,412

(22) PCT Filed: Nov. 13, 2006

(86) PCT No.: PCT/JP2006/322551

§ 371 (c)(1), (2), (4) Date: Mar. 21, 2008

(87) PCT Pub. No.: WO2007/058141

PCT Pub. Date: May 24, 2007

(65) Prior Publication Data

US 2009/0243262 A1    Oct. 1, 2009

(30) Foreign Application Priority Data

Nov. 15, 2005  (JP)  ............... 2005-330418

(51) Int. Cl.
*B60R 21/18* (2006.01)
(52) U.S. Cl. .................................. 280/733
(58) Field of Classification Search .......... 280/728.2, 280/730.1, 733, 743.1, 801.1
See application file for complete search history.

(56) References Cited

U.S. PATENT DOCUMENTS

| 3,682,498 | A | * | 8/1972 | Rutzki | 280/733 |
|---|---|---|---|---|---|
| 5,474,326 | A | * | 12/1995 | Cho | 280/733 |
| 6,019,388 | A | * | 2/2000 | Okazaki et al. | 280/733 |
| 6,109,647 | A | | 8/2000 | Akaba et al. | |
| 6,220,626 | B1 | * | 4/2001 | Utsumi et al. | 280/733 |
| 6,244,621 | B1 | * | 6/2001 | Kameyoshi et al. | 280/733 |
| 6,336,657 | B1 | | 1/2002 | Akaba et al. | |
| 6,471,243 | B1 | * | 10/2002 | Brown | 280/733 |
| 6,533,315 | B2 | * | 3/2003 | Brown et al. | 280/733 |
| 2005/0184491 | A1 | * | 8/2005 | Itoga | 280/730.1 |

FOREIGN PATENT DOCUMENTS

| JP | 11-170950 | 6/1999 |
|---|---|---|
| JP | 11-268608 | 10/1999 |
| JP | 2001-24410 | 1/2001 |
| JP | 2003-205822 | 7/2003 |
| JP | 2004-351948 | 12/2004 |

* cited by examiner

*Primary Examiner*—Paul N Dickson
*Assistant Examiner*—Robert A Coker
(74) *Attorney, Agent, or Firm*—Foley & Lardner LLP

(57) ABSTRACT

There is provided an airbelt system in which an inflator and an anchor are mounted to the seat base without using a flexible pipe and with a relatively simple structure. An anchor for connecting the webbing of the airbelt is rotatably supported on the outer surface of a side plate of a base frame of the seat with a plurality of arcshaped long holes and step bolts passed through the long holes. An inflator is disposed inside the side plate. The gas port of the inflator is substantially coaxial with the rotation axis center of the anchor.

9 Claims, 5 Drawing Sheets

AIRBELT SYSTEM

TECHNICAL FIELD

The present invention relates to an airbelt system for restraining an occupant in a seat in the event of an automobile collision or the like.

BACKGROUND ART

Airbelt systems are seatbelt systems in which a part of a webbing (particularly, a part in contact with the body of an occupant) is an inflatable airbelt, and in which in a vehicle collision or turnover, an inflator is activated to inflate the airbelt.

One end of the airbelt is connected to the seat base or the body floor with an anchor such as an anchor plate or a buckle unit. The anchor is mounted to the seat base or the body floor in such a manner as to tilt in the front-back direction with the front-back motion of the body of the occupant.

FIG. 4 is a anchor mount structure diagram depicted in FIG. 3 of Japanese Unexamined Patent Application Publication No. 11-170950, in which an anchor 3 of a buckle unit 2 is fastened to a seat base 1 with a support pin 4 such that it can be tilted in the directions of the arrows A and B. A tongue unit 5 is detachably attached to the buckle unit 2. To the tongue unit 5 are connected an inflatable bag 7 constituting part of a shoulder belt 6 and an uninflatable lap belt 8.

An inflator 9 is mounted to one side of the seat base 1, and supplies gas to the bag 7 through a flexible pipe 10, the buckle unit 2, and the tongue unit 5.

In the structure of Japanese Unexamined Patent Application Publication No. 11-170950, the inflator 9 is disposed apart from the anchor 3, and accordingly, the flexible pipe 10 is necessary.

FIG. 4 of Japanese Unexamined Patent Application Publication No. 11-268608 illustrates a structure, in which an inflator and an anchor are coaxially and rotatably connected to a mounting bracket erected from the body floor, so that no flexible pipe is needed.

Patent Document 1: Japanese Unexamined Patent Application Publication No. 11-170950.

Patent Document 2: Japanese Unexamined Patent Application Publication No. 11-268608

The structure described in the Japanese Unexamined Patent Application Publication No. 11-170950 needs the flexible pipe 10, thus needing the costs of components and the costs of assembling them.

The structure described in Japanese Unexamined Patent Application Publication No. 11-268608 needs to dispose the anchor and the inflator on the mounting bracket accurately coaxially, thus complicating the structure.

DISCLOSURE OF INVENTION

Accordingly, it is an object of the present invention to provide an airbelt system in which an inflator and an anchor are mounted to a seat base without a flexible pipe and with a relatively simple structure.

An airbelt system of the invention includes: an anchor mounted to a side plate of the seat base of a vehicle seat in such a manner as to be rotatable with the direction of the vehicle seat width as the rotation axis; an airbelt connected to the anchor; and an inflator for inflating the airbelt. The anchor has a plate-like member opposed to the outer surface of the side plate of the seat base, the plate-like member having arc-shaped long holes extending circumferentially about the rotation axis center. The anchor is supported by support members passed through the long holes in such a manner as to be rotatable about the rotation axis center with respect to the side plate. The inflator is disposed inside the side plate in such a manner that its gas port is coaxial with the rotation axis center.

The long holes may be disposed in radially equal positions with respect to the rotation axis center.

A retainer retaining the inflator may be disposed inside the side plate. The retainer and the anchor may be mounted to the side plate with the support members passed through the long holes and the side plate.

The inflator may be substantially columnar in shape. The retainer may include a cylindrical part accommodating the inflator and a flange connected to the cylindrical part. The flange may be opposed to the inner surface of the side plate in such a manner that the inflator is coaxial with the rotation axis center, and the flange may be supported to the side plate by the support members.

The gas port of the inflator may be disposed at the end of the inflator adjacent to the side plate. A gas pipe communicating the gas port with the airbelt may be disposed through the side plate.

BEST MODE FOR CARRYING OUT THE INVENTION

In this invention, the anchor is supported by arc-shaped long holes and support members passed through the long holes in such a manner as to be rotatable with respect to the outer surface of the side plate. Inside the side plate is disposed an inflator, whose gas port is coaxial with the rotation axis center of the anchor. Accordingly, even if the anchor rotates, the relative positional relationship between the airbelt connecting to the anchor and the gas port of the inflator does not change, because the gas port is always located on the rotation axis center of the anchor. Therefore, the inflator and the airbelt can be connected without using a flexible pipe.

In this invention, the inflator does not rotates so that the inflator mount structure is simple.

Since the long holes are disposed in radially equal positions with respect to the rotation axis center, the anchor can be rotated very smoothly.

Since the inflator retainer and the anchor are mounted to the side plate with common support members, mounting parts can be decreased in number.

In this case, the inflator is substantially columnar in shape; the retainer includes a cylindrical part accommodating the inflator and a flange connected to the cylindrical part; and the flange is opposed to the inner surface of the side plate in such a manner that the inflator is coaxial with the rotation axis center, the flange being supported to the side plate by the support members. This arrangement facilitates coaxial arrangement of the columnar inflator and the rotation axis center.

The gas port of the inflator is disposed at the end of the inflator adjacent to the side plate; and a gas pipe communicating the gas port with the airbelt is disposed through the side plate. This arrangement reduces the length of the gas pipe.

An embodiment of the present invention will be described with reference to the drawings.

Figure 1:
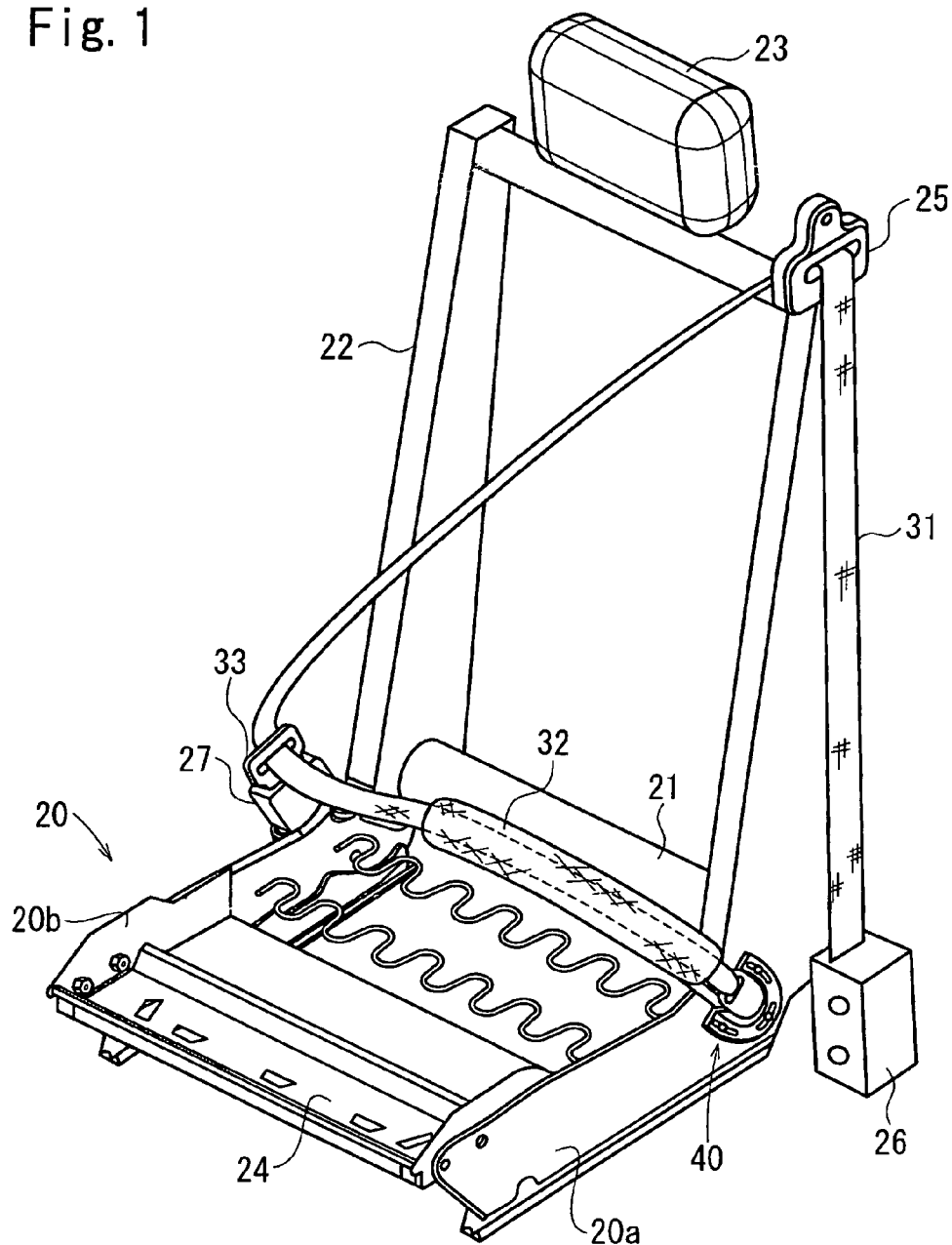
FIG. 1 is a perspective view of the frame of a car seat equipped with an airbelt system according to an embodiment of the present invention.
Figure 2:
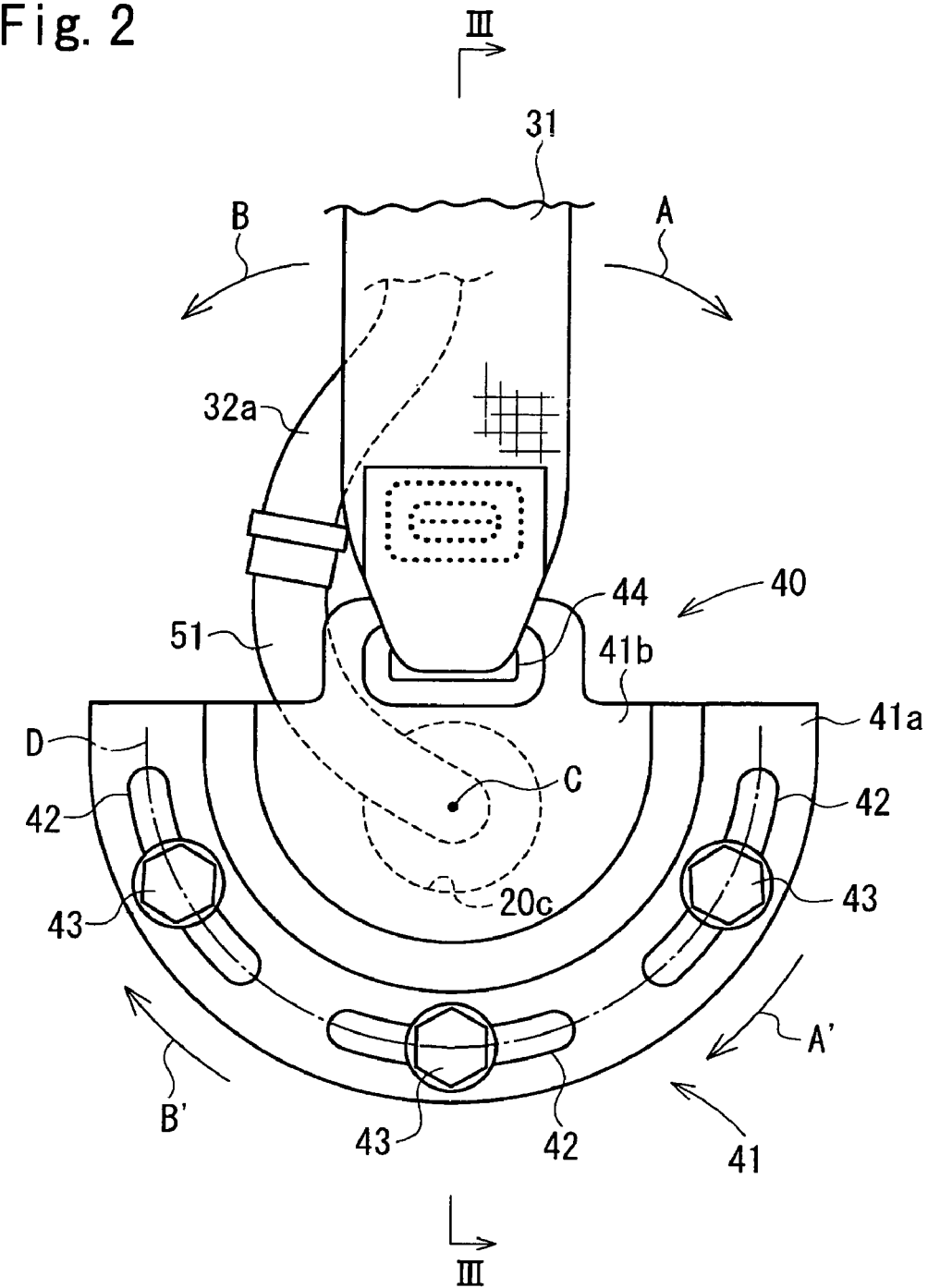
FIG. 2 is a side view of the vicinity of an airbelt connecting anchor of the frame.
Figure 3:
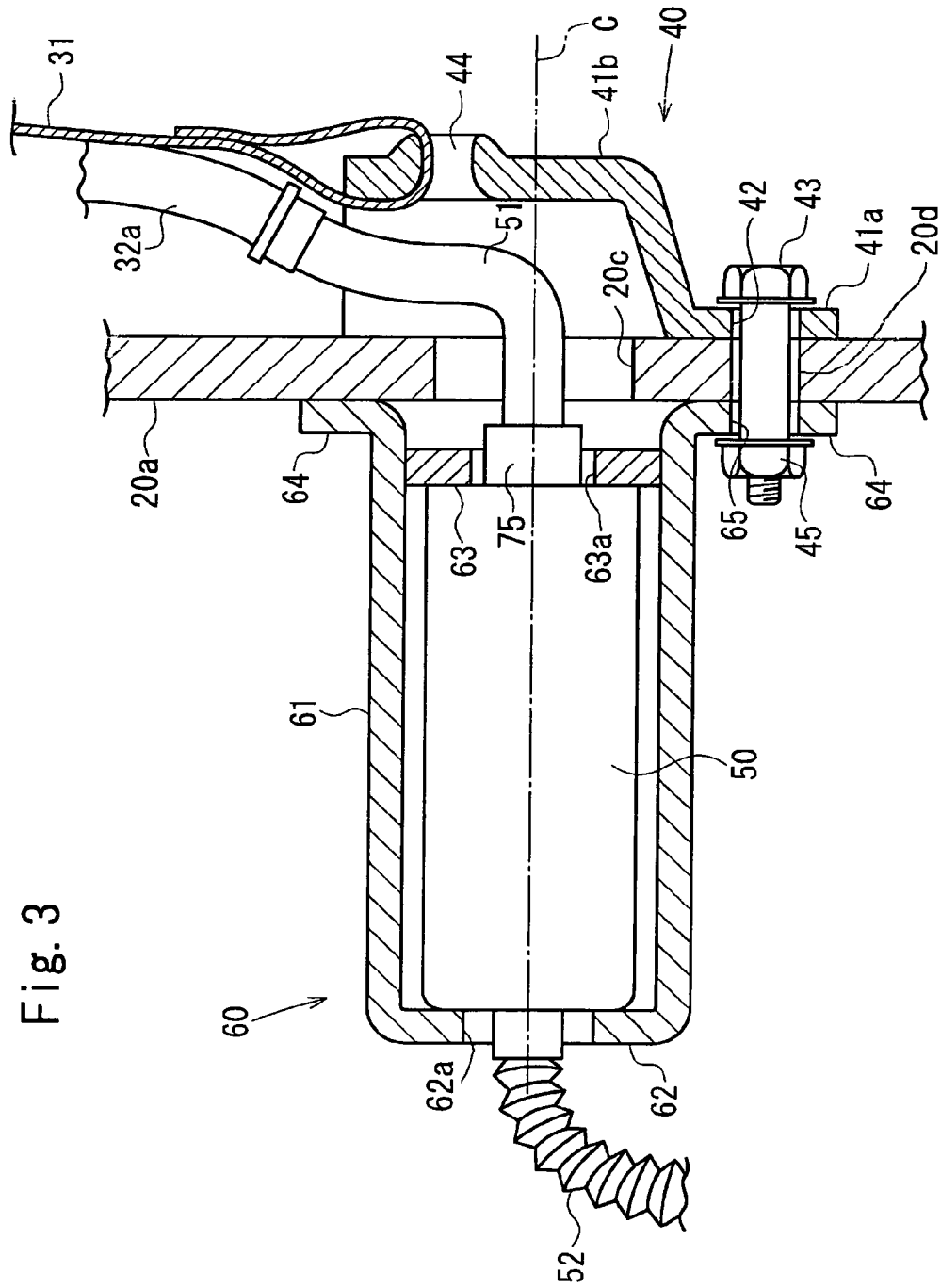
FIG. 3 is a sectional view taken along line III-III of FIG. 2.
Figure 4:
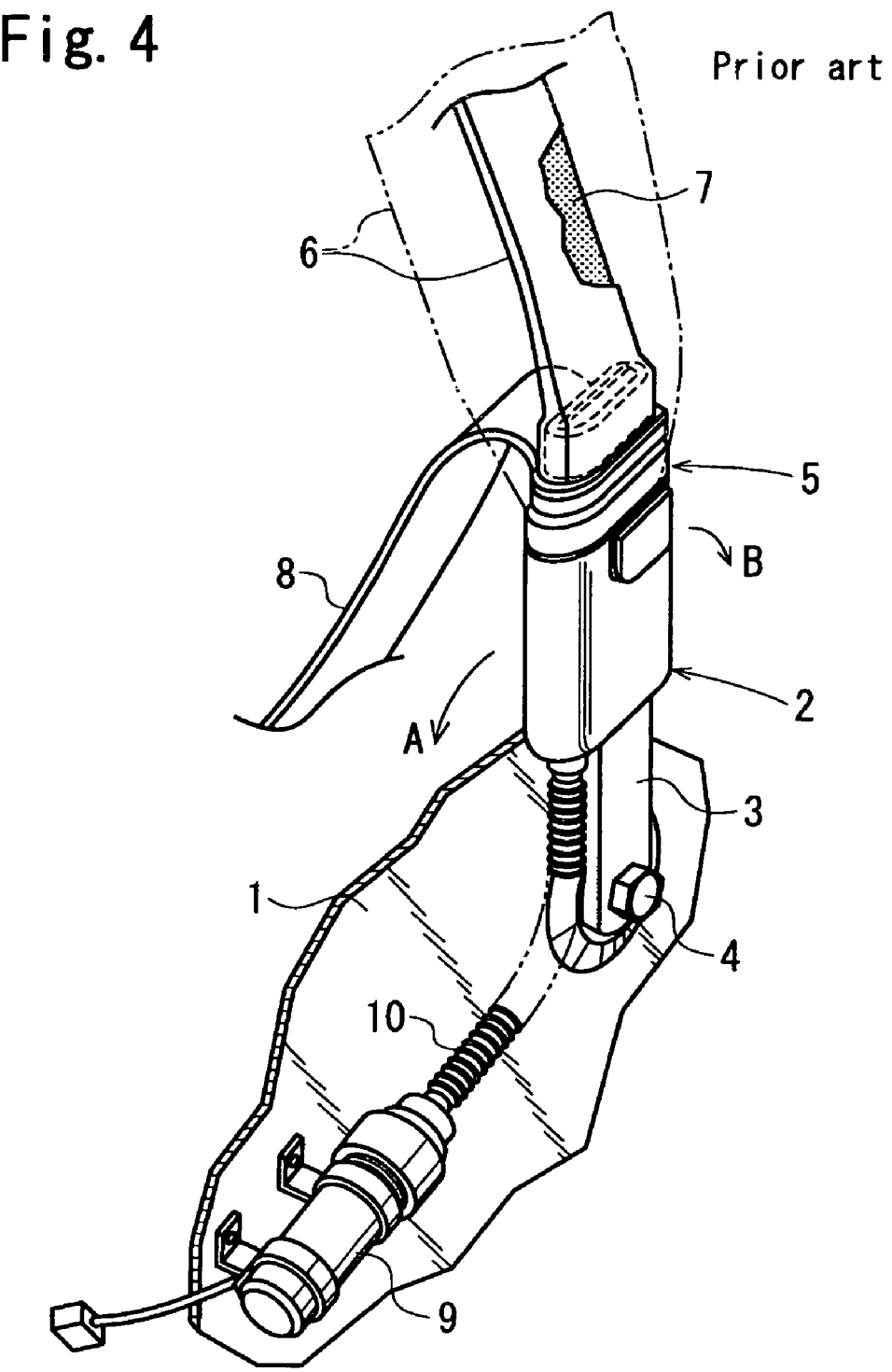
FIG. 4 is a anchor mount structure diagram depicted in FIG. 3 of Japanese Unexamined Patent Application Publication No. 11-170950.
Figure 5:
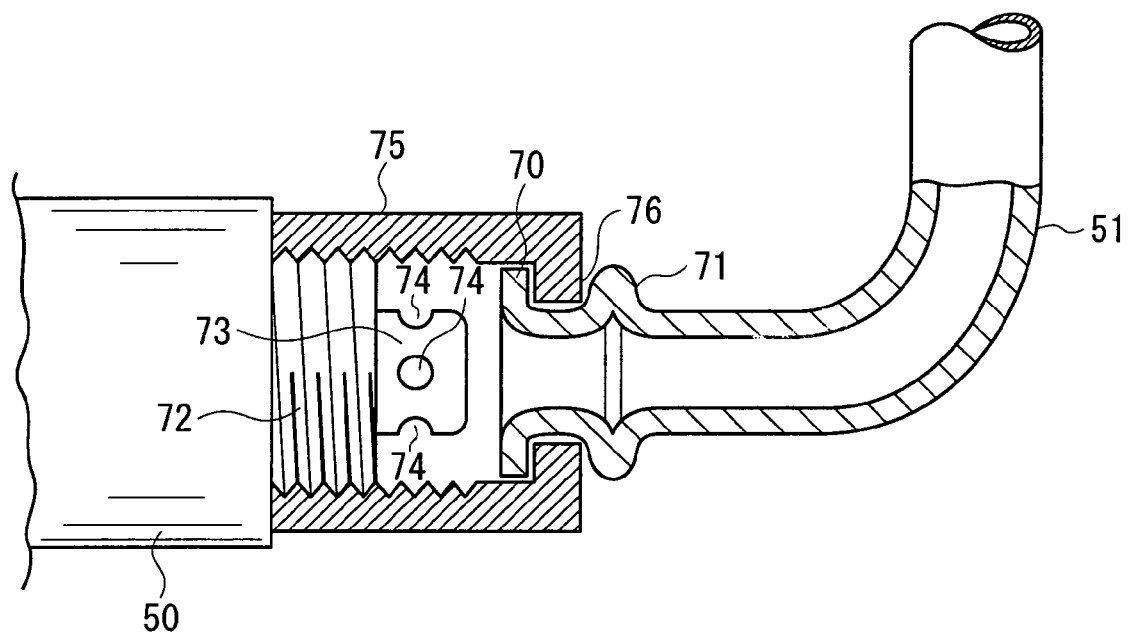
FIG. 5 is a sectional view of the joint section between the pipe end the inflator.

FIG. 1 is a perspective view of the frame of a car seat equipped with an airbelt system according to an embodiment of the present invention; FIG. 2 is a side view of the vicinity of an airbelt connecting anchor of the frame; and FIG. 3 is a sectional view taken along line III-III of FIG. 2. FIG. 5 is a sectional view of the joint section between the pipe and the inflator.

The frame of the car seat includes a base frame (seat base) 20 and a back frame 22 rotatably joined to the base frame 20 with a support shaft 21 and a reclining device (not shown). The back frame 22 has a headrest 23 mounted thereon.

The base frame 20 has left and right side plates 20a and 20b, and a seat pan 24 placed between the front portions of the side plates 20a and 20b.

Although not shown, the base frame 20 has a seat cushion placed thereon, and the back frame 22 has a back cushion at the front.

In this embodiment, a seatbelt shoulder anchor 25 is mounted at the top of the side of the vehicle cabin (a pillar or the like) adjacent to the side plate 20a of the seat, and a seatbelt retractor 26 is mounted at the lower part of the side. A buckle unit 27 for latching a tongue 33, to be described later, is mounted on the side of the side plate 20b.

As shown in FIG. 1, an airbelt connecting anchor (lap anchor) 40 is mounted on the rear outer side of the side plate 20a in such a manner as to be rotatable with the direction of the seat width as the rotation axis. An inflator 50 for inflating a lap bag 32, to be described later, is disposed inside the side plate 20a in the position to face the anchor 40 with the side plate 20a therebetween. The inflator 50 is retained by a retainer 60 and fixed to the side plate 20a.

The detailed structure of the anchor 40, the inflator 50, and the retainer 60 will be described later.

A webbing 31 and the inflatable lap bag 32 are stretched along the front of an occupant in the seat. The webbing 31 is made of a normal uninflatable belt material. The middle of the webbing 31 is passed through a through anchor (its reference numeral is omitted) of the tongue 33. The rear end of the webbing 31 is passed through the shoulder anchor 25 and is then connected to the seatbelt retractor 26 in such a manner as to be rewound therein, while the front end is connected to the anchor 40.

With the tongue 33 engaged with the buckle 27, the part of the webbing 31 adjacent to the shoulder anchor 25 with respect to the tongue 33 serves as a shoulder belt, and the part adjacent to the anchor 40 serves as a lap belt. The lap bag 32 extends along the lap belt.

Although not shown, the lap bag 32 is composed of an inflatable bag body and a cylindrical cover that covers the bag body. The bag body is normally folded in a long and flat shape. When the bag body is in an uninflated state, the cover is of the size that fits along the outer periphery of the folded bag body; when the bag body inflates, the cover extends circumferentially to allow the inflation of the bag body.

In this embodiment, the cover is made of knit that extends freely in the circumferential direction but hardly extends in the longitudinal direction. Accordingly, when the bag body inflates, the stitch of the cover extends in the circumferential direction as the cover extends in the circumferential direction, resulting in a decrease in the size (length) of the cover. Thus, the webbing 31 is strained into close contact with the occupant's body.

The anchor 40 includes a plate-like member 41 that faces the outer surface of the side plate 20a, a plurality of (in this embodiment, three) arc-shaped long holes 42 extending in the circumferential direction around the rotation axis center C of the plate-like member 41, and step bolts 43 passed though the long holes 42, respectively, to rotatably support the plate-like member 41 to the side plate 20a.

As shown in FIG. 2, in this embodiment, the plate-like member 41 has a substantially semicircular plan view. The rotation axis center C substantially agrees with the center of the virtual circle of the plate-like member 41, part of which is the outer circumference of the plate-like member 41. In this embodiment, as shown in FIG. 3, the part of the outer rim of the plate-like member 41 along the substantially semicircular arc-shaped rim forms a flange 41a which overlaps the outer surface of the side plate 20a, and the part inside the flange 41a protrudes laterally from the outer surface of the side plate 20a to form a pocket-like protrusion 41b. As illustrated, the pocket-like protrusion 41b is open substantially upward.

As shown in FIG. 2, the long holes 42 are formed in the flange 41a. The long holes 42 are arranged at regular intervals in radially equal positions with respect to the rotation axis center C (on a virtual circle D with center at the rotation axis center C).

The protrusion 41b has a laterally long webbing insertion hole 44 at the upper rim (the part of the rim of the plate-like member 41 extending along the chordal rim). The webbing 31 is joined to the plate-like member 41 by passing an end of the webbing 31 through the webbing insertion hole 44 and then turning it back so as to wrap the upper rim of the webbing insertion hole 44 and stitching it to the middle.

The anchor mount region of the side plate 20a has an opening 20c for a gas pipe 51, to be described later, to pass through substantially concentrically with the rotation axis center C of the anchor 40. Around the opening 20c is provided step-bolt insertion holes 20d in the positions that agree with the long holes 42 of the anchor 40.

The inflator 50 of the embodiment is substantially columnar in shape. An axial end face of the inflator 50 has a gas port (not shown) coaxially with the axis of the inflator 50. The gas port is connected to the gas pipe 51 for supplying gas to the lap bag 32. The gas pipe 51 is rotatable about the axis of the inflator 50. The gas pipe 51 is substantially in L-shape, whose one end is rotatably connected to the gas port of the inflator 50. Specifically, as shown in FIG. 5, the pipe 51 has a flange 70 at one end and a ring-shaped expanding portion 71 a predetermined distance apart from the flange 70. The inflator 50 has a protrusion 72 at one end, from which a nozzle 73 projects. The nozzle 73 has gas ports 74 on the outer circumference. A joint plug 75 is screwed on a male screw provided on the outer circumference of the protrusion 72. An inward collar 76 projecting from the rear end of the joint plug 75 fits between the flange 70 and the expanding portion 71.

Reference numeral 52 indicates an energizing harness extending from the rear end of the inflator 50.

The gas pipe 51 is not what is called a flexible pipe but a rigid pipe or a semirigid pipe made of metal or hard synthetic resin having no or little flexibility. The other end of the gas pipe 51 is connected to a gas inlet port 32a of the lap bag 32.

As shown in FIG. 3, the inflator retainer 60 includes a substantially cylindrical housing (cylindrical part) 61 coaxially fitted on the inflator 50, an inward flange 62 folded from the axial rear end of the housing 61 to the rear end face of the inflator 50, a ring-shaped cover 63 fitted in one end of the housing 61 to secure the inflator 50 in the housing 61, and a flange 64 extending radially (circumferentially) from the end of the housing 61. The inflator 50 is fixed between the inward flange 62 and the cover 63.

The flange 64 has step-bolt insertion holes 65 in positions to agree with the step-bolt insertion holes 20d of the side plate 20a. The holes 65 are circular in shape.

The gas pipe 51 passes through a central opening 63a of the cover 63 and extends outside the housing 61 coaxially with the housing 61. The harness 52 is drawn from an inside opening 62a of the inward flange 62 toward the outside of the housing 61.

The flange 64 of the retainer 60 is agreed with the inner surface of the side plate 20a so that the axial center of the housing 61 (that is, the axial center of the inflator 50 in the housing 61) agrees substantially with the rotation axis center C of the anchor 40. The gas pipe 51 is routed through the opening 20c and inside of the protrusion 41b of the anchor 40 to the outside of the side plate 20a, and is connected to the gas inlet port 32a of the lap bag 32.

The shafts (their numerals are omitted) of the step bolts 43 are passed through the long holes 42 and the step-bolt insertion holes 20d and 65 which are agreed with one another. The length of the shafts of the step bolts 43 is a little larger than the total thickness of the flanges 41a and 64 and the side plate 20a. Nuts 45 are screwed on the step bolts 43 so that the anchor 40 and the retainer 60 are mounted to the side plate 20a. The anchor 40 is rotatable about the rotation axis center C by the sliding of the step bolts 43 along the long holes 42. The retainer 60 cannot rotate with respect to the side plate 20a since the bolt insertion holes 65 are circular in shape.

The structure of mounting the anchor 40 and the retainer 60 to the side plate 20a with the step bolts 43 is not limited to that. Alternatively, the flange 64 of the retainer 60 may have female screw holes in place of the bolt insertion holes 65, into which the step bolts 43 may be screwed. In this case, the length of the shafts of the step bolts 43 is set a little larger than the total thickness of the flanges 41a of the anchor 40 and the side plate 20a.

In this airbelt system, when the lap belt of the webbing 31 is tilted in the front-back direction (in the direction of the arrows A and B in FIG. 2) by the motion of the occupant, the anchor 40 is also rotated in the front-back direction (in the direction of the arrows A' and B' in FIG. 2) about the rotation axis center C.

The rotation axis center C of the anchor 40 and the gas port of the inflator 50 are coaxial with each other. Accordingly, even if the anchor 40 rotates, the relative positional relationship between the webbing 31 and the lap bag 32 connecting to the anchor 40 and the gas port does not change, because the gas port of the inflator 50 is always located on the rotation axis center C of the anchor 40. Therefore, the gas pipe 51 is rotated about the axial center of the inflator 50. Accordingly, the inflator 50 and the lap bag 32 can be connected without using a flexible pipe as the gas pipe 51.

This airbelt system has a simple-inflator mount structure, since the inflator 50 does not rotate.

In this embodiment, the anchor 40 can be rotated very smoothly, since the long holes 43 are disposed at radially equal positions with respect to the rotation axis center C.

In this embodiment, the number of components for mounting the inflator retainer 60 and the anchor 40 to the side plate 20a can be small, since they are mounted with common step bolts 43 and nuts 45.

In this embodiment, the inflator retainer 60 includes the substantially cylindrical housing (cylindrical part) 61 coaxially fitted on the inflator 50 and the flange 64 extending radially from one end of the housing 61, and the flange 64 is agreed with the inner surface of the side plate 20a so that the axial center of the housing 61 (that is, the axial center of the inflator 50 in the housing 61) agrees with the rotation axis center C of the anchor 40. This arrangement facilitates arranging the inflator 50 coaxially with the rotation axis center C.

In this embodiment, the gas pipe 51 extending from one end of the inflator 50 is routed through the opening 20c, which is coaxial with the rotation axis center C of the side plate 20a, to the outside of the side plate 20a. This saves the length of the gas pipe 51.

It is to be understood that the foregoing embodiment is only an example of the invention and that the invention is not limited to the embodiment.

For example, the number of the long holes of the anchor may be either larger than or smaller than three. All the long holes may not be disposed in the radially equal positions with respect to the rotation axis center of the anchor.

Although the anchor of the embodiment is a lap anchor, a buckle for latching the tongue may be used.

The present application is based on. Japanese Patent Application (Application No. 2005-330418) filed on Nov. 15, 2005, all of which is incorporated by reference.

The invention claimed is:

1. An airbelt system comprising:
an anchor mounted to a side plate of a seat base of a vehicle seat in such a manner as to be rotatable about a rotation axis that extends in a direction across the width of the seat;
an airbelt connected to the anchor; and
an inflator for inflating the airbelt; wherein
the anchor has a plate-like member opposed to an outer surface of the side plate of the seat base, the plate-like member having arc-shaped long holes extending circumferentially about a rotation axis center;
the anchor is supported by support members passed through the long holes in such a manner as to be rotatable about the rotation axis center with respect to the side plate; and
the inflator is disposed on an inner side of the side plate in such a manner that a gas port of the inflator is coaxial with the rotation axis center.

2. The airbelt system according to claim 1, wherein the long holes are disposed in radially equal positions with respect to the rotation axis center.

3. The airbelt system according to claim 1, further comprising:
a retainer retaining the inflator disposed on the inner side of the side plate; wherein
the retainer and the anchor are mounted to the sideplate with the support members passed through the long holes and the side plate.

4. The airbelt system according to claim 3, wherein:
the inflator is substantially columnar in shape;
the retainer has a cylindrical part accommodating the inflator and a flange connected to the cylindrical part; and
the flange is opposed to the inner surface of the side plate in such a manner that the inflator is coaxial with the rotation axis center, the flange being supported to the side plate by the support members.

5. The airbelt system according to claim 4, wherein:
the gas port of the inflator is disposed at the end of the inflator adjacent to the side plate; and
a gas pipe communicating the gas port with the airbelt is disposed through the side plate.

6. The airbelt system according to claim 5, wherein the gas pipe is a rigid or semirigid pipe.

7. The airbelt system according to claim 6, wherein the gas pipe is made of metal or hard synthetic resin.

8. The airbelt system according to claim 6, wherein the gas pipe is bent substantially in L-shape.

9. The airbelt system according to claim 6, wherein one end of the gas pipe is rotatably connected to the gas port of the inflator, and the other end of the gas pipe is connected to the airbelt.

* * * * *